United States Patent [19]

Bridgeford et al.

[11] Patent Number: 4,844,129

[45] Date of Patent: Jul. 4, 1989

[54] POLYDEXTROSE COMPOUNDS AS ANTI-PLEAT LOCK ADDITIVES FOR CELLULOSE CONTAINING CASINGS

[75] Inventors: Douglas J. Bridgeford, Champaign; Rodney J. Hine, Danville, both of Ill.

[73] Assignee: Teepak, Inc., Oak Brook, Ill.

[21] Appl. No.: 174,647

[22] Filed: Mar. 29, 1988

Related U.S. Application Data

[63] Continuation-in-part of Ser. No. 47,843, May 6, 1987, abandoned.

[51] Int. Cl.$^4$ ............................................. A22C 13/00
[52] U.S. Cl. ................................ 138/118.1; 138/145; 426/138
[58] Field of Search ............................ 138/118.1, 145; 426/129, 135, 138; 428/36

[56] References Cited

U.S. PATENT DOCUMENTS

| | | | |
|---|---|---|---|
| 3,533,808 | 10/1970 | Cameron | 99/176 |
| 3,766,165 | 10/1973 | Rennhard | 536/1.1 |
| 3,876,794 | 4/1975 | Rennhard | 426/152 |
| 3,898,348 | 8/1975 | Chiu et al. | 426/413 |
| 4,137,947 | 2/1979 | Bridgeford | 138/118.1 |
| 4,226,264 | 10/1980 | Bridgeford | 738/118.1 |
| 4,442,868 | 4/1984 | Smith et al. | 138/145 X |
| 4,489,114 | 12/1984 | Bridgeford | 428/36 |

FOREIGN PATENT DOCUMENTS

7316093 12/1973 France .
1544155 4/1979 United Kingdom .

OTHER PUBLICATIONS

Polydextrose, Pfizer Chemicals Division, Technical Information Bulletin, 1985.
Pfizer Polydextrose, Pfizer Chemical Division, Advertising Bulletin, 1985.
Pfizer Specificaiton, Pfizer Chemicals Division, Technician Specification, Documents #FG–S6810 and FG–S6814, 1985/1986.
Pfizer Introduces, Pfizer Chemical Division, Adverstising Bulletin (copies in Ser. No. 47,843).

*Primary Examiner*—William Cuchlinski, Jr.
*Attorney, Agent, or Firm*—William J. Crossetta; Michael L. Dunn

[57] ABSTRACT

Polydextrose compound containing anti-pleat lock coatings, food casings containing said coatings, and a method for their production which comprises applying to the surface thereof an aqueous coating composition containing a polydextrose compound are disclosed. The coated food casings exhibit improved food release characteristics, improved resistance to strand breakage, and improved anti-pleat lock characteristics.

35 Claims, No Drawings

POLYDEXTROSE COMPOUNDS AS ANTI-PLEAT LOCK ADDITIVES FOR CELLULOSE CONTAINING CASINGS

This application is a continuation-in-part of pending U.S. Ser. No. 47,843, filed May 6, 1987 now abandoned.

TECHNICAL FIELD

This invention relates to the use of polydextrose compounds as anti-pleat lock additives, to improved food casings having a coating containing a polydextrose compound, and more particularly to functional coatings for cellulosic containing food casings which contain a polydextrose compound to impart anti-pleat lock characteristics without sacrificing strand strength characteristics.

BACKGROUND OF THE INVENTION

The packaging of items in flexible form fitting encasements is practiced worldwide with multifarious products. Such means of encasement is particularly suitable for consumer packaging and/or processing packaging of emulsified foods in casings, such as sausage meat products, processed dairy cheese products and other foods of similar consistency. In many such packaging applications, the speed and efficiency of the packaging process is particularly dependent upon the ability of the casing to withstand various folding and other stresses, where failure would render a casing unsuitable for stuffing. One typical type of casing which is subject to particularly stressful handling is the shirred, regenerated cellulose containing casing used in the production of sausages.

BACKGROUND ART

In the manufacture of regenerated cellulose sausage casings, viscose is typically extruded through an annular die into a coagulating and regenerating bath to produce a tube of regenerated cellulose. The tube is subsequently washed, plasticized with glycerine, and dried while inflated under substantial air pressure. After drying, the casing is wound on reels and subsequently shirred on high-speed shirring machines, such as those described in U.S. Pat. Nos. 2,010,626; 2,583,654; 2,722,714; 2,722,715; 2,723,201; and 3,451,827. In the shirring process, lengths of from about 40 to about 200 feet of casing are typically compacted (shirred) into strands of between about 4 and about 30 inches. The shirred casing strands are packaged and provided to the meat processor wherein the casing strands are deshirred at extremely high speeds while stuffing with a meat emulsion. The meat can be subsequently cooked and the casing removed from the meat processed therein with high-speed peeling machines.

It has been useful to lubricate and internally humidify cellulose casings during the shirring process by spraying a mist of water and a stream of lubricant through the shirring mandrel to increase the flexibility of the casing. Such method does reduce casing film failure and shirred strand breakage but has not proved commercially adequate. One particularly persistent type of casing failure is referred to in the art as "pinholing" and is believed to be caused by pleat-locking, an undesired adhesion of adjacent folds of a shirred casing, which tears the casing when expanded during unshirring and stuffing. Pinholing causes the tearing of the casing during the high speed stuffing thereof and can result in significant loss of time and production to the meat packer.

In U.S. Pat. No. 3,898,348, the coating of internal surfaces of cellulose sausage casings with a homogeneous mixture of a water soluble cellulose ether and an additive selected from animal, vegetable, mineral, and silicon oils and alkylene oxide adducts of partial fatty acid esters has been proposed. The coating is applied to the casing surface in a composition such that the additive is present in a proportion of about 0.1 times the weight of the water soluble cellulose ether and up to about 0.5 milligrams per square inch of casing surface. While such materials have excellent meat release characteristics and can also effectively protect the casing from "pinholing" failures occasioned by pleat locking, the shirred strand strength characteristics have been less than desirable, tending to be fragile, often breaking on doffing or when the strand is stuffed.

U.S. Pat. No. 4,137,947 to Bridgeford discloses a method of improving the meat release (peelability) of cellulose sausage casings by the application of a meat release coating to the internal surface thereof. The coating comprises a homogeneous admixture of a water soluble cellulose ether, the partial fatty acid ester of sorbitan or mannitan and a water soluble polyalkylene ether of the type $R(-OC_2H_4O)_n-H$ wherein R represents long chain alkyl radicals having 8 to 16 carbon atoms and n is an integer from 4 to 40. An aqueous coating composition containing the water soluble cellulose ether, partial fatty acid ester and polyalkylene ether is typically applied to the interior of the sausage casing prior to shirring. While this has been a successful meat release agent for stuffed casing, there are some commercial difficulties. Moisture level in the unstuffed strand must be carefully controlled or the composition may tend to provoke pleat lock and pinholing. The use of prior known anti-pleat lock agents though solving the pleat lock problem can give fragile strands, particularly when the moisture content of the strand is at the higher end of typical commercial ranges. This tendency results in a commercial problem with broken strands during handling or during introduction of the closed end and gives rise to significant yield loss during the shirring process.

U.S. Pat. No. 4,442,868 to Smith et al, which claims a food colorant and flavorant coating composition, discloses a long list of typical materials which might have utility as release additives with the coatings of his invention when a peelable casing is desired. Rabinogalactin and polydextrose are disclosed in that list but no information or disclosure relating to an anti-pleat lock effect is made.

U.S. Pat. No. 4,489,114 to Bridgeford discloses and claims the use of arabinogalactan as a release agent and indicates such compound is an effective anti-pleat lock additive. This additive has been found effective but is costly and not readily commercially available.

Therefore, there remains a need for an anti-pleat lock composition with or without meat release characteristics that does not have the disadvantages of the prior compositions.

DISCLOSURE OF THE INVENTION

An object of this invention is to provide new anti-pleat lock additives useful in flexible form fitting encasements.

A further object of this invention is to provide new anti-pleat lock additives for casings used in the processing and/or packaging of food products.

A still further object of this invention is to overcome disadvantages of prior release and anti-pleat lock coatings for regenerated cellulose casing materials.

An additional object of this invention is to provide shirred casing materials with improved release and anti-pleat lock characteristics.

A further object of this invention is to provide shirred regenerated cellulose casing materials with improved resistance to pinholing.

Another further object of this invention is to provide shirred casing materials with good meat release properties and strand flexibility after long storage.

These and other objects of the invention have been generally accomplished by providing a coating composition containing polydextrose compounds which have anti-pleat lock characteristics. The polydextrose compounds are used in an aqueous composition with a water soluble cellulose ether. In a preferred form of the invention, the aqueous composition comprises an aqueous medium containing a cellulose ether, a polydextrose compound, and a polyalkylene glycol ether. The composition of the invention results in artificial regenerated cellulose casings having excellent peelability from meat product under high speed mechanical peeling conditions. The cellulose casings, having coatings of the invention, can be shirred on high speed shirring machines without a substantial frequency of strand breakage and the so shirred casings of the invention can be readily deshirred in high speed stuffing operations without substantial strand breakage, pinholing or other casing failure. The casing also has sufficient strand strength to withstand normal handling required for providing end closures in the casing and placement of the strands in high speed stuffing machines. The coating composition does not cause deterioration of the casing or sticking of the pleats during storage.

The term polydextrose compound, as is generally used in the prior art, refers to a condensation polymer of a sugar with an acid catalyst. In the prior art, polydextrose compounds include compounds which are and are not co-polymers with the acid, and/or are co-polymers with or without a polyhydric alcohol. The polydextrose compounds preferred in this invention, are those formed from simple sugars such as glucose and maltose. They are the condensation product of a food grade, relatively non-volatile, edible, organic polycarboxylic acid, such as maleic, citric, fumaric, tartaric, succinic, adipic, itaconic, or terephthalic acids and the like. The food grade anhydrides of succinic, adipic, and itaconic acids are also meant to be included. The inclusion of a polyhydric alcohol is also preferred. Such polyols are added to the sugar/acid reaction mixture prior to polycondensation to act as an internal plasticizer to reduce viscosity and/or to improve color and taste. Suitable preferred polyols include sorbitan, glycerol, erythritol, xylitol, mannitol, and galactitol. The chemical and physical properties of polydextrose compounds generally, and methods for producing them, are described in the literature and patents which include U.S. Pat. Nos. 3,766,165 and 3,876,994 to Rennhard. Generally, polydextrose compounds are manufactured by a melt polymerization process wherein the sugars, are crosslinked or polymerized with any one or more of a series of acids.

Polydextrose compounds generally can be water soluble or insoluble depending upon whether or not the polymer is crosslinked with the acid. A soluble polydextrose compound is preferred having a molecular weight below about 20,000, and which can tolerate temperatures up to between 250° and 300° F. Polydextroses compounds have been utilized as a low-calorie sugar substitute for many foods and as a bulking agent. A particularly preferred polydextrose compound for purposes of this invention is manufactured from glucose and maltose using an edible polycarboxylic acid that is sold under the tradename Polydextrose and manufactured by Pfizer, Inc.

In the practice of this invention, the polydextrose compound is in aqueous composition with a cellulose ether. Any suitable water soluable cellulose ether may be utilized for practicing the invention. Typical of such materials are methyl cellulose, carboxymethyl cellulose, ethylhydroxy ethyl cellulose, hydroxyethyl cellulose, hydroxypropyl cellulose, carboxymethyl hydroxyethyl cellulose, and hydroxy-propylmethyl cellulose. A preferred material is carboxymethyl cellulose as it combines to provide superior release properties at low concentrations and is easy to process. Normally, the cellulose ethers are available as salts, particularly the sodium salts. For purposes of this invention, reference to a water soluble cellulose ether is intended to encompass the alkali and alkaline earth metal salts thereof. Generally, the molecular weight of the ether is not a limiting factor except that it must not be so great as to act as an adhesive in the coating composition. In one embodiment of the invention, cellulose ethers of low molecular weight having from about 5 to about 15 carboxy methyl groups per 10 anhydroglucose units is preferred. The cellulose ethers may be supplemented by other casing coating agents such as hemi-cellulose, carboxyl oxidized dextrin, and carboxymethylated starch.

The coating compositions of the invention may also include other materials such as plasticizers, lubricants, or materials which will aid in the storage, coloring, meat release, anti-pleat lock characteristics, and the like of the coating. A preferred additional additive is one or more of the polyalkylene glycol ethers, which are incorporated primarily for their plasticizing properties. The polyalkylene glycol ethers are the condensation products of long chain fatty alcohols and alkylene oxides, generally of the type $R(-OC_2H_4O)_N-H$ wherein R represents long chain alkyl radicals having 8 to 16 carbon atoms and N is an integer from 4 to 40. Preferred polyalkylene glycol ethers are the polyoxyethylene ethers of higher fatty alcohols such as lauryl alcohol and oleyl alcohol and which have high solubility in water. Illustrative of commercially available polyethers useful in the practice of the present invention include those sold under the designation "Brij." by Atlas Chemical Industries of Delaware, for example, "Brij 35" (polyoxyethylene [23]lauryl ether). "Brij 76" (polyoxyethylene (10) stearyl ether) "Brij 56" (polyoxyethylene (10) cetyl ether), and "Brij 58" (polyoxyethylene (20) cetyl ether).

In a further preferred embodiment of the invention the coating also includes a partial fatty acid ester of sorbitan or mannitan. Such ester is included primarily for its lubricant properties. The term "partial fatty acid ester of sorbitan of mannitan" includes within its meaning the palmitic, oleic, and stearic acid esters. In a preferred embodiment of the invention, the partial fatty acid ester is a sorbitan ester, namely sorbitan trioleate.

The polydextrose compound may be utilized in the coating compositions of the instant invention in any amount which provides an effective improvement in release and/or anti-pleat lock characteristics. Any suitable amount of the polydextrose compound may be utilized in the practice of the instant invention. Generally, an amount of the polydextrose compound between about 0.10 percent and about 5.0 percent by weight of the coating composition has been found to be suitable. A preferred formulation comprises from about 0.5 to about 1.5 percent polydextrose compound by weight of the aqueous coating solution.

The amount of water soluble cellulose ether utilized may be any amount which gives suitable peeling properties of the casing from the meat product. Typically, the range is between about 0.25 and about 2.5 percent by weight of the coating composition. A preferred amount of between about 0.5 and about 1.5 percent by weight of the coating composition has resulted in good release properties without an excessive amount of material being utilized to produce an undesirably thick coating on the casing.

The amount of plasticizer utilized in the composition depends upon the efficiency of the plasticizer and may be any suitable amount. The preferred polyalkylene glycol plasticizers have been found effective in amounts of as little as about 0.025 percent by weight and typically are used in amounts of from about 0.05 to about 0.25 percent by weight to provide sufficient plasticizing without promoting breakage of the strand.

The amount of fatty acid ester utilized in the composition of this invention depends upon its efficiency and any suitable amount can be used. Typical amounts are from about 0.25 to about 5.0% by weight of the composition with amounts in the range of about 0.5 to about 2.5% by weight being preferred.

The coating compositions of the invention are typically homogeneous and are typically applied by spraying into the casing immediately prior to shirring. However, it should be understood that it is also within the scope of the instant invention to apply the coatings by other means such as slug coating or dip coating with or without reversal of the casing after it is coated.

The amount of coating applied to the casing may vary greatly. Generally, however, as small an amount as possible is applied to obtain the desired release and anti-pleat lock characteristics. Typically the amount of coating material composition applied to the casing is from about 0.01 mg/in$^2$ to about 0.5 mg/in$^2$ of casing.

It has also been unexpectedly found that the use of a polydextrose compound as an anti-pleat lock additive in cellulosic ether containing release coatings appears synergistic in that it allows an unexpected reduction of the amount of cellulosic ether used in the coating composition. Further, the viscosity of the coating material in its aqueous medium is appreciably lower than other coating materials of the prior art. This reduction in viscosity appears to be beneficial in spray systems in that it produces a superior spray pattern with very fine droplet size and allows reasonably low pressure differentials across the spray jet. The use of lower pressures in the coating system reduces maintenance problems such as seal leakage and the like.

The following examples are provided to illustrate the invention and are not intended to restrict the scope thereof. All percentages are expressed as weight percentages and all temperatures are in degrees Centigrade unless otherwise indicated. The examples and disclosures thereof are intended to be illustrative and nonexhaustive. The compositions of this invention can include ingredients having functions other than release, anti-pleat lock or plasticizing. For instance, lubricants, flavorants, colorants, and/or anti-bacterial agents can be added to the compositions of the invention. Similarly, multiple various additives can be utilized with the compositions of the invention providing they do not deleteriously effect the function thereof.

EXAMPLES 1-8

Each of Examples 1-8 demonstrates the comparative effect of various coatings on coating cohesive strength at varying concentrations. In the experiments, aqueous coating compositions containing different amounts of lubricant (Span 85—a sorbitantrioleate from Atlas Chemical), surfactant (tx100, an octylphenoxypolyethoxyethanol from ROHM & HAAS), carboxymethyl cellulose (CMC 7LF) and Polydextrose (PD-a terpolymer of glucose, citric acid, and sorbitol sold under the name Polydextrose by Pfizer Chemical Division) were tested on Code 25, 3.2 cm flat width, flat stock cellulosic casing to determine their effect upon cohesive peel strength. In each instance a slug of the aqueous coating composition was introduced into the casing at ambient temperature and passed through a nip padder at 30 lbs/in$^2$ to produce a sandwiched film having a coating add-on of approximately 0.05 mg/sq.in. The slug coated casing was then cut into strips parallel to the axis of the casing, which were then allowed to equilibrate for approximately twelve (12) weeks at 60% relative humidity and a temperature of 25° C. The so equilibrated, coated, sandwiched casing was then "T" peeled with an Instron table model Universal testing machine at 10 in/min peel speed. The aforesaid testing procedure is a very harsh test of adhesiveness/cohesiveness and is considered equivalent to a 12% moisture content casing test. Average cohesive peel is calculated by measuring the average force (gm/0.5 in) necessary to peel the film apart. Average cohesive peel of less than 20.00 is desirable. The results can be found in Table I.

TABLE I

| | 60% RH Cohesive Peel Strength | |
|---|---|---|
| Example | Composition (in water) | Avg. Cohesive Peel (gm/0.5 in) |
| (1) | 1.0% CMC 7LF | 50.0 ± 2.0 |
| (2) | 1.0% Span 85 | 1.5 |
| (3) | 0.5% PD | 1.2 ± 0.2 |
| (4) | 2.0% PD | 0.8 ± 0.04 |
| (5) | 1.0% PD<br>1.0% Span 85 | 3.8 ± 1.8 |
| (6) | 1.0% CMC 7LF<br>0.9% Span 85<br>0.1% tx100 | 31.3 ± 11.0 |
| (7) | 1.0% CMC 7LF<br>0.9% Span 85<br>0.1% tx100<br>1.0% PD | 13.0 ± 3.0 |
| (8) | 1.0% CMC 7LF<br>0.9% Span 85<br>0.1% tx100<br>33.0% Propylene Glycol<br>1.0% PD | 12.6 ± 2.6 |
| (9) | 0.5% CMC 7LF<br>2.0% Span 85<br>0.2% tx100<br>0.5% PD | 2.0 ± 0.2 |

As can be seen from the tabulated results, the addition of a polydextrose compound (PD) to a coating composition containing very adhesive CMC 7LF is particularly effective in reducing the cohesive peel strength of the coating.

EXAMPLES 10-19

Each of the experiments in Examples 10-19 demonstrates the comparative anti-pleat lock effect of a polydextrose compound modified commercial coatings on cellulosic casings. Various coating compositions, were applied to code 21, 24, and 27 cellulosic casing, at ambient temperature, by spraying on a shirring machine during a shirring operation at the rate of about 14 feet/sec. Several shirred strands were produced for each coating composition.

The coated and shirred strands were stuffed with a meat emulsion, twisted into links, cooked, and then peeled by means of a high speed Ranger Appollo automatic peeling apparatus operating at between about 6 and 12 feet per second. During the stuffing phase the strands were carefully observed for pinholes or defects of any sort which could be attributable to pleat locking or adhesion. The peeling of the stuffed and cooked casing was evaluated by observing the average incidence of casing failure. An acceptable level is at least 95-97% failure free; a good level is from 97%-99.5%; an excellent level is from about 99.5% to 100% failure free.

The results of the aforementioned testing is tabulated in Table II.

TABLE II
Stuffing Tests With Polydextrose

| Example | Composition (in water) | Casing Code | Strand Length (ft.) | Strands De-Stuffed | fects |
|---|---|---|---|---|---|
| (10) | 1.0% CMC 7LF<br>1.0% Span 85<br>0.1% PD | 24 | 95 | 5 | 0 |
| (11) | 0.75% CMC 7LF<br>1.0% Span 85<br>0.25% PD | 24 | 95 | 5 | 0 |
| (12) | 0.5% CMC 7LF<br>1.0% Span 85<br>0.5% PD | 24<br>21 | 95<br>125 | 5<br>295 | 0<br>1 |
| (13) | 0.25% CMC 7LF<br>1.0% Span 85<br>0.75% PD | 24<br>21 | 95<br>125 | 5<br>55 | 0<br>0 |
| (14) | 0.5% CMC 7LF<br>2.0% Span 85<br>0.5% PD | 21 | 125 | 300 | 1 |
| (15) | 0.75% CMC 7LF<br>3.0% Span 85<br>0.75% PD | 21 | 125 | 295 | 2 |
| (16) | 0.5% CMC 7LF<br>3.0% Span 85<br>1.5% PD | 21 | 125 | 296 | 0 |
| (17) | 0.5% CMC 7LF<br>1.0% Span 85<br>1.5% PD<br>5.0% 1,3-Butanediol** | 27*<br>24 | 110<br>125 | 200<br>100 | 7<br>0 |
| (18) | 0.75% CMC 7LF<br>1.0% Span 85<br>1.5% PD<br>7.5% 1,3-Butanediol | 27<br>21 | 110<br>110 | 150<br>150 | 0<br>0 |
| (19) | 0.75% CMC 7LF<br>1.0% Span 85<br>1.0% PD<br>5.0% 1,3-Butanediol | 21 | 110 | 180 | 0 |

*This Code 27 casing was particularly old and judged to be so inherently defective as to not represent a fair test of the effect created by the coating.
**1,3 Butanediol was added as an antimycotic, antimicrobial agent. As can be seen from the results a polydextrose compound added to the interior coating provides consistently low defect levels for the stuffed casing.

What is claimed is:

1. Cellulose containing food casing having a coating thereon containing an anti-pleat lock amount of a water soluble, polydextrose compound comprising a condensation polymer of a simple sugar, an edible, organic polycarboxylic acid and a polyol.

2. The casing of claim 1 wherein said coating comprises from about 0.01 mg/sq in. to about 0.5 mg/sq in. of the casing.

3. The casing of claim 1 wherein said coating further comprises a water soluble cellulosic ether.

4. The casing of claim 3 wherein said cellulosic ether is selected from the group consisting of methyl cellulose, carboxymethyl cellulose, ethylhydroxy ethyl cellulose, hydroxyethyl cellulose, hydroxypropyl cellulose, carboxymethyl hydroxyethyl cellulose, and hydroxypropylmethyl cellulose.

5. The casing of claim 4 wherein said cellulosic ether is carboxy methyl cellulose.

6. The casing of claim 1 wherein said coating further comprises a plasticizer.

7. The casing of claim 6 wherein the plasticizer comprises a polyalkylene glycol ether.

8. The casing of claim 1 wherein the coating comprises said polydextrose compound and a cellulosic ether.

9. The casing of claim 8 wherein the coating additionally contains a lubricant.

10. The casing of claim 9 wherein the coating contains sorbitan trioleate.

11. The casing of claim 8 wherein the coating comprises sorbitan trioleate, a carboxymethyl cellulose, and said polydextrose compound.

12. The casing of claim 11 wherein the coating further comprises water and a mineral oil lubricant.

13. The casing of claim 11 wherein the coating also comprises an anti-microbial compound.

14. The casing of claim 13 wherein the anti-microbial is 1,3-butanediol.

15. The casing of claim 14 wherein the coating composition comprises from about 0.1-1.5% carboxymethyl cellulose, from about 0.1-5.0% sorbitan trioleate, from about 0.1-5.0% of said polydextose compound and up to about 10% 1,3-butanediol.

16. A method of imparting anti-pleat lock characteristics to a cellulose containing food casing comprising applying thereto an anti-pleat lock amount of a water soluble polydextrose compound comprising a condensation polymer of a simple sugar, an edible organic poly-carboxylic acid and a polyol.

17. The method of claim 16 wherein said polydextrose compound is applied in an aqueous composition.

18. The method of claim 17 wherein said aqueous composition additionally contains a plasticizer.

19. The method of claim 18 wherein said plasticizer is a polyalkylene glycol ether.

20. The method of claim 17 wherein said aqueous composition additionally contains a cellulosic ether.

21. The method of claim 20 wherein said composition contains an anti-microbial compound.

22. The method of claim 21 wherein said anti-microbial compound is 1,3-butanediol.

23. The method of claim 20 wherein said aqueous composition additionally contains a lubricant.

24. The method of claim 23 wherein said cellulosic ether is selected from the group consisting of methyl cellulose, carboxymethyl cellulose, ethylhydroxy ethyl cellulose, hydroxyethyl cellulose, hydroxypropyl cellulose, carboxymethyl hydroxyethyl cellulose, and hydroxypropylmethyl cellulose.

25. The method of claim 23 wherein the coating comprises sorbitantrioleate, carboxymethyl cellulose, and said polydextrose compound.

26. The method of claim 25 wherein the coating additionally contains 1,3-butanediol.

27. A cellulosic casing coating composition comprising an anti-pleat lock amount of a water soluble polydextrose compound comprising a condensation polymer of a simple sugar, an edible organic polycarboxylic acid and a polyol.

28. The composition of claim 27 wherein said polydextrose compound is in aqueous composition.

29. The composition of claim 28 additionally comprising a cellulosic ether.

30. The composition of claim 28 additionally comprising a plasticizer.

31. The composition of claim 29 additionally comprising a lubricant.

32. The composition of claim 29 additionally comprising an anti-microbial compound.

33. A flexible form encasement having a coating thereon containing an anti-pleat lock amount of a water soluble polydextrose compound comprising a condensation polymer of a simple sugar, an edible organic polycarboxylic acid and a polyol.

34. A food casing having a coating thereon containing an anti-pleat lock amount of a water soluble polydextrose compound comprising a condensation polymer of a simple sugar, an edible organic polycarboxylic acid and a polyol.

35. The food casing of claim 34 wherein said coating further comprises a water soluble cellulosic ether.

* * * * *